United States Patent [19]

Ohtake

[11] Patent Number: 4,602,329
[45] Date of Patent: Jul. 22, 1986

[54] DATA PROCESSING SYSTEM HAVING AN ADDRESS TRANSLATION UNIT SHARED BY A CPU AND A CHANNEL UNIT

[75] Inventor: Akihito Ohtake, Tokyo, Japan
[73] Assignee: NEC Corporation, Tokyo, Japan
[21] Appl. No.: 592,961
[22] Filed: Mar. 23, 1984

[30] Foreign Application Priority Data

Mar. 23, 1983 [JP] Japan .................. 58-48233

[51] Int. Cl.$^4$ .................... G06F 12/10; G06F 13/12
[52] U.S. Cl. .................................................. 364/200
[58] Field of Search .......................... 364/200, 900

[56] References Cited

U.S. PATENT DOCUMENTS

| | | | |
|---|---|---|---|
| 3,810,105 | 5/1974 | England ......................... | 364/200 |
| 3,820,079 | 6/1974 | Bergh et al. .................. | 364/200 |
| 4,137,565 | 1/1979 | Mager et al. .................. | 364/200 |
| 4,189,769 | 2/1980 | Cook et al. .................... | 364/200 |

*Primary Examiner*—Harvey E. Springborn
*Assistant Examiner*—A. Williams

*Attorney, Agent, or Firm*—Sughrue, Mion, Zinn, Macpeak, and Seas

[57] ABSTRACT

In a data processing system for use in accessing a main memory from each of a central processing unit and a channel unit through a common data bus, an address translation circuit is incorporated in the central processing unit so as to translate each logical address into a real address physically allotted to the main memory and is used in common by the central processing unit and the channel unit. Address translation is carried out by the address translation circuit selectively for the central processing unit and the channel unit. When the main memory is accessed from the channel unit through the central processing unit, an indication signal is delivered from the main memory only to the central processing unit to indicate either reception or supply of a data group. The central processing unit energizes the channel unit to assign the data bus to the channel unit. Thereafter, the data group is transferred between the main memory and the channel unit through the data bus.

4 Claims, 2 Drawing Figures

FIG. I

DATA PROCESSING SYSTEM HAVING AN ADDRESS TRANSLATION UNIT SHARED BY A CPU AND A CHANNEL UNIT

BACKGROUND OF THE INVENTION

This invention relates to a data processing system comprising a main memory, a central processing unit, and a channel unit, which are all connected to a data bus and, in particular, to a data processing system for use in accessing the main memory from each of the central processing unit and the channel unit.

A virtual or logical address method is often adopted in a data processing system when a main memory is used in common to a plurality of programs and a memory capacity of the main memory is smaller than a capacity necessary for all of the programs. With the virtual address method, a virtual address should be converted or translated into a real address specifying each of physical addresses of the main memory when the main memory is accessed by each of a central processing unit and a channel unit.

It is preferable that such address translation is made as fast as possible. In particular, the address translation should proceed faster on an access from the central processing unit than on an access from the channel unit.

A conventional data processing system is provided with an address translating table memorized in a main memory to translate each virtual address into a real address. With the conventional system, address translation is possible without an increase of superfluous hardware. However, the main memory should be accessed to look up the address translating table each time when the address translation becomes necessary. Therefore, overhead time extremely becomes long for the address translation. This means that the address translating table can not be substantially utilized by the central processing unit because of a long overhead time. At any rate, the conventional data processing system inevitably brings about degradation of system performance.

In U.S. Pat. No. 3,902,163, issued to G. M. Amdahl et al and assigned to Amdahl Corporation, a data processing system is described which comprises a storage control section coupled to a central processing unit. The storage control section comprises a primary buffer memory for storing an address translation table transferred from a main memory. Such a buffer memory may generally be called a Table Lookaside Buffer (usually abbreviated to TLB in the art) and is operable at a high speed in comparison with the main memory. With the Amdahl system, address translation can rapidly be made by the use of the primary buffer memory when the central processing unit accesses the main memory. However, no suggestion is offered as to address translation of a logical address given from a channel unit. Therefore, such address translation slowly proceeds by accessing an address translating table stored in the main memory as mentioned before.

In order to carry out rapid address translation related to the channel unit, another buffer memory should be incorporated in the channel unit so as to store an additional address translation table which is identical with the address translation table stored in the primary buffer memory incorporated in the central processing unit. This, however, results in an increase of hardware. Inasmuch as both of the primary and the additional buffer memories must always be coincident in their contents with each other, superfluous hardware should also be added to the primary and the additional buffer memories as peripheral circuits.

SUMMARY OF THE INVENTION

It is an object of this invention to provide a data processing system wherein address translation can rapidly be carried out with an increase of hardware suppressed in comparison with the Amdahl system even when an access originates at a channel unit.

It is another object of this invention to provide a data processing system of the type described, wherein overhead time is reduced for address translation and, therefore, system performance is raised up.

A data processing system to which this invention is applicable is for use in accessing a main memory from each of a central processing unit and a channel unit through a data bus shared by the central processing and the channel units. The central processing unit comprises first access signal producing means for producing a first access signal and first request signal producing means for producing a first request signal. The channel unit comprises second access signal producing means for producing a second access signal and second request signal producing means for producing a second access signal. The main memory produces an acknowledgement signal when accessed. According to this invention, the central processing unit further comprises first delivering means responsive to a selected one of the first and the second access signals for delivering a third access signal to the main memory through the data bus, second delivering means operatively coupled to the first delivering means for delivering one of the first and the second request signals to the main memory that is selected in correspondence to the selected one of the first and the second access signal, and energizing means operatively coupled to the second delivering means and at least to the second request signal producing means and responsive to the acknowledgement signal for energizing the channel unit with the data bus assigned to the channel unit when the second request signal producing means produces the second request signal and the second delivering means delivers the second request signal as the one of the first and the second request signals.

BRIEF DESCRIPTION OF THE DRAWING

FIG. 1 is a block diagram of a data processing system according to a preferred embodiment of this invention.

DESCRIPTION OF THE PREFERRED EMBODIMENTS

Figure 2:
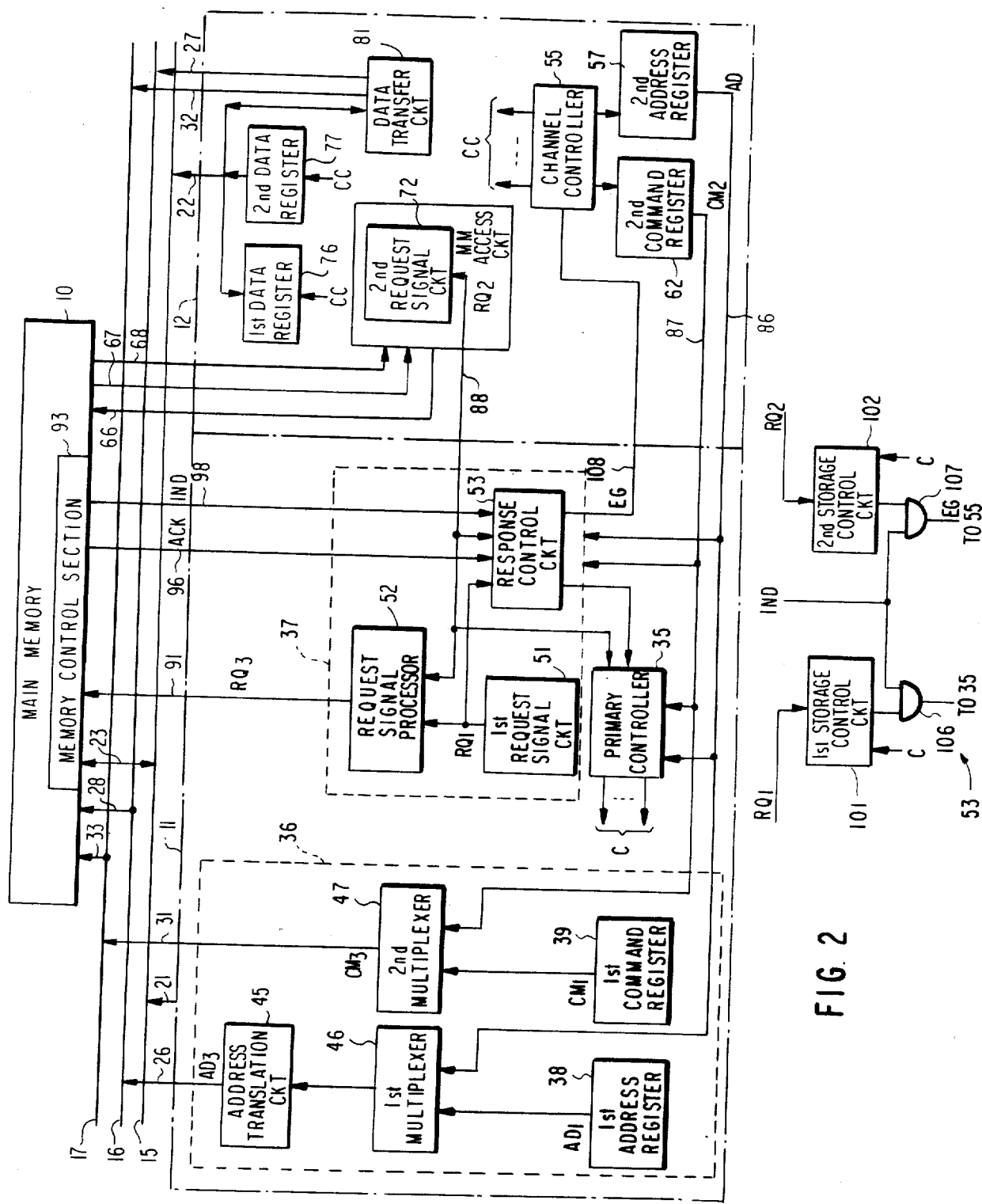
FIG. 2 is a block diagram for use in describing a part of the data processing system illustrated in FIG. 1 in detail.

Referring to FIG. 1, a data processing system according to a preferred embodiment of this invention is for use in accessing a main memory 10 from each of a central processing unit 11 and a channel unit 12. The channel unit 12 may be called an input/output processor (IOP). A data bus 15 is laid between the main memory 10 and the central processing unit 11 and between the main memory 10 and the channel unit 12 together with an address bus 16 and a command bus 17. Each of the central processing unit 11 and the channel unit 12 is connected to the main memory 10 through the data bus 15, the address bus 16, and the command bus 17 as will presently be described. In other words, the data bus 15, the address bus 16 and the command bus 17 are shared by the central processing unit 11 and the channel unit 12. More particularly, the data bus 15 is connected through first, second, and third data lines 21, 22, and 23 to the central processing unit 11, the channel unit 12, and the main memory 10, respectively, while the address bus 16 is connected through first, second, and third address lines 26, 27, and 28 to the central processing unit 11, the channel unit 12, and the main memory 10, respectively. In addition, the command bus 17 is connected through first, second, and third command lines 31, 32, and 33 to the central processing unit 11, the channel unit 12, and the main memory 10, respectively. In the example being illustrated, the second address line 27, and the second command line 32 serve to carry out transfer operation between the channel unit 12 and input/output devices (not shown), as will become clear as the description proceeds. The transfer operation between the channel unit 12 and the input/output devices is out of the scope of this invention and will therefore not be described in detail in the instant specification.

The illustrated central processing unit 11 comprises a primary controller 35 for delivering a set of control signals C to an access circuit 36 and a request circuit 37 to put them into operation in timed relation to the control signals C. The access circuit 36 comprises a first address register 38 and a first command register 39 for holding a first address signal $AD_1$ and a first command signal $CM_1$, respectively, under control of the primary controller 35. Both of the first address signal $AD_1$ and the first command signal $CM_1$ may collectively be called a first access signal because they serve to access the main memory 10. In this connection, a combination of the first address register 38 and the first command register 39 may be referred to as a first access signal producing circuit.

It should be mentioned here that the first address signal $AD_1$ specifies a logical address for designating a program or the like. Therefore, the first address signal $AD_1$ should be translated or converted into a physical or real address in order to actually access the main memory 10 in a manner to be described later.

Anyway, the first address signal $AD_1$ is supplied to an address translation circuit 45 through a first multiplexer 46 while the first command signal $CM_1$ is given to a second multiplexer 47. The first and the second multiplexers 46 and 47 are operatively coupled to the channel unit 12, as will be described later.

The request circuit 37 is operable in timed relation to the access circuit 36 under control of the primary controller 35 and comprises a first request signal circuit 51 for producing a first request signal $RQ_1$ in response to a preselected one of the control signals C. The first request signal circuit 51 may be a flip flop. The first request signal $RQ_1$ is delivered to a request signal processor 52 and a response control circuit 53 both of which are put into operation in a manner to be described later.

The channel unit 12 comprises a channel controller 55 for producing a group of channel control signals CC to control various parts of the channel unit 12. A second address register 57 is controlled by the channel controller 55 and produces second address signal $AD_2$ kept therein. The second address signal $AD_2$ specifies a second logical address designated by the input/output device in the form of a logical or virtual address, like the first address signal $AD_1$. A second command register 62 is controlled together with the second address register 57 and produces a second command signal $CM_2$. The second address signal $AD_2$ and the second command signal $CM_2$ may collectively be called a second access signal, as mentioned in conjunction with the first address signal $AD_1$ and the first command signal $CM_1$.

It is to be mentioned here that each of the first and the second command signals $CM_1$ and $CM_2$ is representative of a species of accesses, namely, a readout access or a write-in access.

The illustrated channel unit 12 further comprises a main memory access circuit 64 put into operation by the channel controller 55. The main memory access circuit 64 is connected direct to the main memory 10 through an access request signal line 66, an access acknowledgement signal line 67, and an indication signal line 68, like in a conventional data processing system. The indication signal line 68 serves to indicate, to the channel unit 12, either transmission or reception of data. At any rate, the access request signal line 66, the access acknowledgement signal line 67, and the indication signal line 68 are used together with the second address line 27 and the second command line 32 only when the main memory 10 is directly accessed by the channel unit 12, as will become clear as the description proceeds.

The main memory access circuit 64 is specified by a second request signal circuit 72 which may be a flip flop, like the first request signal circuit 51 and which produces a second request signal $RQ_2$ representative of an access request sent from the channel unit 12.

The channel unit 12 comprises first and second data registers 76 and 77 coupled to the data bus 15 through the second data line 22. The first and the second data registers 76 and 77 are operable under the control of the channel controller 55. Specifically, the first and the second data registers 76 and 77 are enabled when the readout and the write-in accesses are specified by the second command signal $CM_2$, respectively, on production of the second request signal $RQ_2$. Thus, the first and the second data registers 76 and 77 are operatively coupled to the main memory access circuit 64 and the second command register 62.

The second data line 22, the second address line 27, and the second command line 32 are coupled to a data transfer control circuit 81 for controlling the transfer operation between the input/output device and the main memory 10. Such transfer operation will not be described any longer.

It should be noted here that the second address signal $AD_2$, the second command signal $CM_2$, and the second request signal $RQ_2$ are not sent directly to the main memory 10 but sent to the central processing unit 11 through first, second, and third interconnection lines 86, 87, and 88 connected to the first multiplexer 46, the second multiplexer 47, and the request signal processor 52, respectively. This means that the channel unit 12 indirectly accesses the main memory 10 through the central processing unit 11 when address translation is necessary about the second address signal $AD_2$.

Let the channel unit 12 produce a readout request so as to read a predetermined data group out of the main memory 10 by the use of a predetermined virtual or logical address specified by the second address signal $AD_2$. In this event, the second address signal $AD_2$ and the second command signal $CM_2$ are kept in the second address register 57 and the second command register 62, respectively, under control of the channel controller 55. The second command signal $CM_2$ specifies the readout request. Simultaneously, the second request signal circuit 72 is loaded with a logic "1" level as the second request signal $RQ_2$.

The second address signal $AD_2$ and the second command signal $CM_2$ are sent to the first and the second multiplexers 46 and 47 and to the primary controller 35. As a consequence, the second address and the second command signals $AD_2$ and $CM_2$ are delivered to the request circuit 37. The second request signal $RQ_2$ is sent from the second request signal circuit 72 to the request signal processor 52 and to the primary controller 35. Responsive to the second request signal $RQ_2$, the primary controller 35 makes the first multiplexer 46 select the second address signal $AD_2$. As a result, the first multiplexer 46 sends the second address signal $AD_2$ as a selected address signal to the address translation circuit 45. The address translation circuit 45 converts or translates the selected address signal into a physical or real address corresponding to the predetermined logical address.

The primary controller 35 makes the second multiplexer 47 select the second command signal $CM_2$. The second multiplexer 47 produces the second command signal $CM_2$ as a selected command signal which may be called a third command signal $CM_3$.

After the address translation is made by the address translation circuit 45, the request circuit 37 is enabled by the primary controller 35. More specifically, the request signal processor 52 checks whether or not the central processing unit 11 is accessing the main memory 10. If the central processing unit 11 is not accessing the main memory 10, the request signal processor 52 produces the second request signal $RQ_2$ as a third request signal $RQ_3$ on a main memory request line 91. The third request signal $RQ_3$ is specified by the logic "1" level. On the other hand, the request signal processor 52 produces the first request signal $RQ_1$ as the third request signal $RQ_3$ while the central processing unit 11 is accessing the main memory 10. This means that the central processing unit 11 preferentially processes an access issued from the central processing unit 11 in comparison with an access issued from the channel unit 12.

The main memory 10 receives the third request signal $RQ_3$ at a memory control section 93. The memory control section 93 supplies an acknowledgement signal ACK to the central processing unit 11 through an acknowledgement signal line 96 in a known manner when the main memory 10 can receive the third request signal $RQ_3$. The acknowledgement signal ACK is specified by the logic "1" level. Reception of the acknowledgement signal ACK puts the central processing unit 11 into a state wherein each of the data, the address, and the command buses 15 to 17 can exclusively be used by the central processing unit 11.

The acknowledgement signal ACK is transferred through the response control circuit 53 to the primary controller 35. The primary controller 35 makes the address translation circuit 45 supply the third address signal $AD_3$ to the main memory 10 through the first address line 26, the address bus 16, and the third address line 28. Likewise, the primary controller 35 makes the second multiplexer 47 supply the third command signal $CM_3$ to the main memory 10 through the first command line 31, the command bus 17, and the third command line 33. Thus, the third access signal which is a combination of the third address signal $AD_3$ and the third command signal $CM_3$ is delivered from the access circuit 36 to the main memory 10. As a result, a combination of the address translation circuit 45 and the second multiplexer 47 may be referred to as a first delivery circuit for delivering the third access signal to the main memory 10. Likewise, the request signal processor 52 may be called a second delivery circuit for delivering the third request signal $RQ_3$ to the main memory 10. It will be needless to say that the first and the second access signals are selected as the third access signal when the first and the second request signals $RQ_1$ and $RQ_2$ are selected as the third request signal $RQ_3$, respectively. In other words, the selected one of the first and the second access signals is in correspondence to the selected one of the first and the second request signals $RQ_1$ and $RQ_2$.

The main memory 10 executes operation in accordance with the third command signal after interpretation of the third command signal $CM_3$. Inasmuch as it is assumed before that the exemplified third command signal $CM_3$ specifies the readout request, readout operation is carried out to read the predetermined data group out of the main memory 10 in accordance with the third address signal $AD_3$.

When the predetermined data group is put on the third data line 23, the memory control circuit 93 produces an indication signal IND indicative of fetch or supply of the predetermined data group. The indication signal IND is sent through an indication signal line 98 to the response control circuit 53 of the central processing unit 11.

Referring to FIG. 2 together with FIG. 1, the response control circuit 53 comprises first and second storage control circuits 101 and 102 operable in response to the control signals C for storing the first and the second request signals $RQ_1$ and $RQ_2$, respectively. The first and the second request signals $RQ_1$ and $RQ_2$ are derived from the first and the second storage control circuits 101 and 102 to be sent to the primary controller 35 and channel unit 12 through first and second AND gates 106 and 107 enabled by the indication signal IND. In the example being illustrated, the second request signal $RQ_2$ is delivered as an energizing signal EG from the second storage control circuit 102 to the channel unit 12 through the second AND gate 107 and an internal connection line 108. The energizing signal EG is specified by the logic "1" level.

Supplied with the energizing signal EG, the channel controller 55 looks up the second command signal $CM_2$ stored in the second command register 62. Inasmuch as the second command signal $CM_2$ is indicative of the readout request, the channel controller 55 puts the first data register 76 into an enable state. As a result, the predetermined data group which stands on the data bus 15 is fetched into the first data register 76 through the second data line 22. Thus, the energizing signal EG serves to assign the data bus 15 to the channel unit 12 when the second request signal $RQ_2$ is produced from the channel unit 12.

In FIG. 2, when the first request signal $RQ_1$ is read out of the first storage control circuit 101 to be sent through the first AND gate 106 to the primary controller 35, the central processing unit 11 is put into operation under control of the primary controller in a usual manner.

It is mentioned here that both of the acknowledgement and the indication signals ACK and IND are sent to the central processing unit 11 alone even when the second request signal $RQ_2$ is selected by the request signal processor 52. Therefore, it is unnecessary to add any flag to each of the acknowledgement and the indication signals ACK and IND so as to identify each of the central processing unit 11 and the channel unit 12.

Although the description has thus far been described as regards the readout request, the illustrated system can effectively be operable when a write-in request is issued from the channel unit 12 in the form of the second command signal $CM_2$. In this event, the energizing signal EG is also sent back to the channel unit, as is the case with the readout request. The channel controller 55 enables the second data register 77 to send a data group kept therein to the main memory 10 through the data bus 15, after looking up the second command signal $CM_2$. Any other operations are similar to those mentioned before.

Thus, the illustrated data processing system carries out high-speed address translation of each logical address given from the channel unit 12, by the use of the address translation circuit 45. Stated otherwise, no internal address translation circuit is necessary in the channel unit 12. It is therefore possible to reduce an amount of hardware necessary for address translation. In addition, each of the data, the address, and the command buses 15 to 17 is effectively assigned to each of the central processing unit 11 and the channel unit 12 because the central processing unit 11 always monitors the access request issued from the channel unit 12 in the form of a logical address.

While this invention has thus far been described in conjunction with a preferred embodiment thereof, it will readily be possible for those skilled in the art to put this invention into practice in various other manners. For example, a real address may be sent from the channel unit 12 through the central processing unit 11 to the main memory 10. The indication signal IND may be for distinguishing between fetch and supply of a data group. In this case, either a fetch or a supply signal is delivered from the response control circuit to each of the primary and the channel controllers 35 and 55. Production of such a fetch or a supply signal is possible by the use of a decoder. With this structure, the second command register 62 may not be monitored by the channel controller 55. Further, the acknowledgement signal ACK may be monitored in the response control circuit 53 together with the first and the second request signals $RQ_1$ and $RQ_2$ to individually distribute the acknowledgement signal ACK to the primary and the channel controllers 35 and 55, respectively.

What is claimed is:

1. In a data processing system for use in accessing a main memory from each of a central processing unit and a channel unit through a data bus shared by said central processing and said channel units, said central processing unit comprising first access signal producing means for producing a first access signal and first request signal producing means for producing a first request signal, and channel unit comprising second access signal producing means for producing a second access signal and second request signal producing means for producing a second access signal, said main memory producing an acknowledgement signal when accessed, the improvement wherein said central processing unit further comprises:

first delivering means responsive to a selected one of said first and second access signals for delivering a third access signal to said main memory through said data bus;

second delivering means operatively coupled to said first delivering means for delivering one of said first and said second request signals to said main memory that is selected in correspondence to said selected one of said first and said second access signals; and energizing means operatively coupled to said second delivering means and at least to said second request signal producing means and responsive to said acknowledgement signal for energizing said channel unit with said data bus assigned to said channel unit when said second request signal producing means produces said second request signal and said second delivering means delivers said second request signal as said one of the first and the second request signals.

2. A data processing system as claimed in claim 1, said first and said second access signals comprising first and second address signals given in the form of logical addresses, respectively, said third access signal comprising a third address signal for physically specifying each address of said main memory, wherein said first delivering means comprising:

address converting means for converting a selected one of said first and said second address signals into said third address signal.

3. A data processing system as claimed in claim 2, said first and said second access signals comprising first and second command signals related to said first and second address signals to specify commands to be sent to said main memory, respectively, wherein said first delivering means comprises:

means for supplying said main memory with a selected one of said first and said second command signals as a part of said third access signal.

4. A data processing system as claimed in claim 1, wherein said energizing means comprises:

means responsive to said request acknowledgement signal and coupled to said first and said second request producing means for supplying said channel unit with a channel energization signal so as to allot said data bus to said channel unit when said second request signal is sent to said main memory as said selected request signal;

said channel unit comprising:

means operatively coupled to said second access signal producing means and responsive to said channel energization signal for carrying out operation in accordance with said second access signal.

* * * * *

UNITED STATES PATENT AND TRADEMARK OFFICE
CERTIFICATE OF CORRECTION

PATENT NO. : 4,602,329

DATED : July 22, 1986

INVENTOR(S) : Akihito Ohtake

It is certified that error appears in the above-identified patent and that said Letters Patent is hereby corrected as shown below:

Column 7, line 56, after "nal," delete "and" and insert --said--.
Column 8, line 6, after "and" insert --said--.
Column 8, line 37, after "and" insert --said--.

Signed and Sealed this

Third Day of February, 1987

Attest:

DONALD J. QUIGG

Attesting Officer

Commissioner of Patents and Trademarks